(12) United States Patent
Nejsum

(10) Patent No.: US 7,559,569 B2
(45) Date of Patent: Jul. 14, 2009

(54) TRAILER FOR TOWING AFTER A TOWING VEHICLE, A SYSTEM COMPRISING A TRAILER AND A TOWING VEHICLE, AND A METHOD OF STEERING A TRAILER AROUND A TURNING POINT

(75) Inventor: Lars Nejsum, Vedbæk (DK)

(73) Assignee: Hardi International A/S, Taastrup (DK)

( * ) Notice: Subject to any disclaimer, the term of this patent is extended or adjusted under 35 U.S.C. 154(b) by 254 days.

(21) Appl. No.: 10/537,427

(22) PCT Filed: Dec. 2, 2003

(86) PCT No.: PCT/DK03/00826

§ 371 (c)(1),
(2), (4) Date: Dec. 19, 2005

(87) PCT Pub. No.: WO2004/050457

PCT Pub. Date: Jun. 17, 2004

(65) Prior Publication Data

US 2006/0125208 A1 Jun. 15, 2006

(30) Foreign Application Priority Data

Dec. 2, 2002 (DK) .............................. 2002 01860

(51) Int. Cl.
*B60D 1/173* (2006.01)
(52) U.S. Cl. ...................................... 280/459; 280/468
(58) Field of Classification Search ............... 280/455.1, 280/459, 511, 457, 467, 468, 460.1, 462, 280/463, 456.1, 442; 172/667, 677
See application file for complete search history.

(56) References Cited

U.S. PATENT DOCUMENTS 3,454,285 A * 7/1969 Van Peursem ............... 280/468

(Continued)

FOREIGN PATENT DOCUMENTS

BE 473218 5/1947

(Continued)

OTHER PUBLICATIONS

Esders et al., O + P Othydraulik and Pneumatik, 38, Nr. 4, (1994).

*Primary Examiner*—Anne Marie Boehler
(74) *Attorney, Agent, or Firm*—Finnegan, Henderson, Farabow, Garrett & Dunner, L.L.P.

(57) ABSTRACT

The invention relates to trailer (1) for towing after a towing after a towing vehicle, said trailer (1) comprising a frame (3) configured for carrying a load and having a front end with a coupling (5) configured for connecting the trailer (1) to the towing vehicle and allowing that the trailer (1) and the towing vehicle are able to assume mutually angular positions during turning about a turning point O; and a rear end. The trailer also has a separate wheel frame (8) that is connected to the frame (3) by means (10) that allow a relative turning of the frame in relation to the wheel frame (8) during turning of the trailer about the turning point, said wheel frame (8) comprising oppositely arranged wheels (4) that support the trailer (1) during the towing and that are arranged at a distance from each other close to a respective longitudinally extending side of the frame (3); and actuator means (15) for producing said relative turning of the frame (3). The invention is characterized in that the connecting means (10) also allow a controlled transversal movement of the frame (3) in a direction towards or away from said turning point (O) simultaneously with said relative turning of the frame (3); and that the trailer (1) comprises actuator means (15) for producing said transversal movement of the frame (3).

22 Claims, 3 Drawing Sheets

U.S. PATENT DOCUMENTS

Figure 1A:
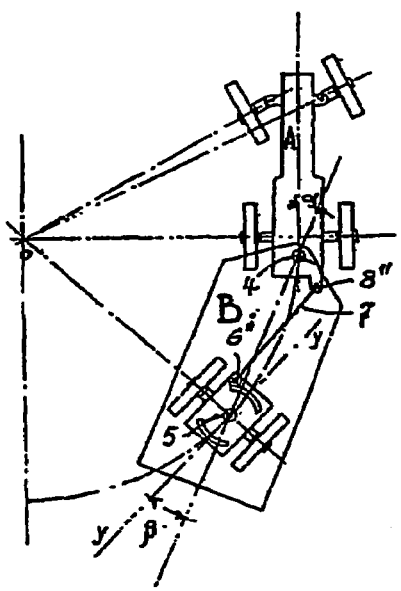

| | | | | |
|---|---|---|---|---|
| 4,019,754 A | * | 4/1977 | Hinckley | 280/456.1 |
| 4,351,408 A | | 9/1982 | Moll | |
| 4,502,561 A | * | 3/1985 | Kober et al. | 280/455.1 |
| 4,664,402 A | * | 5/1987 | Kober et al. | 280/455.1 |

FOREIGN PATENT DOCUMENTS

| | | |
|---|---|---|
| DE | 893 298 | 10/1953 |
| DE | 28 44 684 | 4/1980 |
| EP | 0 350 008 | 1/1990 |
| EP | 0 653 343 | 5/1995 |
| EP | 0 862 855 | 9/1998 |
| FR | 1 526 035 | 5/1968 |
| GB | 821330 | 10/1959 |
| WO | WO 95/16347 | 6/1995 |

\* cited by examiner

TRAILER FOR TOWING AFTER A TOWING VEHICLE, A SYSTEM COMPRISING A TRAILER AND A TOWING VEHICLE, AND A METHOD OF STEERING A TRAILER AROUND A TURNING POINT

The present invention relates to a trailer for towing after a towing vehicle as defined in the preamble to claim 1.

Thus, as a starting point the trailer according to the invention comprises a frame configured for carrying a load and having a front end with a coupling for connecting the trailer to the towing vehicle in such a manner that the trailer and the towing vehicle are able to assume mutual angle positions during turning around a turning point, and a rear end. Besides, the trailer comprises a separate wheel frame that is connected to the frame by means of connecting means that allow a relative turning of the frame in relation to the wheel frame during said turning around a turning point. This wheel frame comprises oppositely arranged wheels that support the trailer during the towing and are arranged at a distance in relation to each other near a respective longitudinally extending side of the frame. Additionally, the trailer has actuator means for producing said relative turning of the frame. It being difficult to define the notion of actual parallel longitudinally extending sides of the frame, said longitudinally extending sides can be perceived as areas situated to each side of a longitudinally extending line of symmetry for the frame that extends from the front end of the frame to the rear end of the frame.

Trailers of this type are already known from eg BE 473 218 and EP 350 008. It is a common feature of these trailers that it is possible to actively influence and modify the movement of the trailer, when the trailer is moved through curves by means of the towing vehicle.

For instance, there may be a need for performing such influence when a towing vehicle and a trailer are to move along parallel tracks on a field and when, to this end, the towing vehicle and the trailer have to turn at the end of the field. In particular in that context it is important that the wheels of the trailer do not interfere with an extra track on the field, which may harm the crop, but rather that the wheels of the trailer accurately follow the wheel tracks that were initially established in the field or generated during driving by the preceding towing vehicle. The mutual spacing transversally to the driving direction between the wheels on the trailer is, of course, as a starting point selected to be in correspondence with the corresponding space between the wheels of the towing vehicle, thereby avoiding the generation of an additional wheel track during straight-ahead operation. However, during the turning an active influence has to be exerted on the trailer to avoid generation of additional wheel tracks.

By the construction of such trailers it is necessary to take into account the stability problems that may arise, in particular in case the trailer is to carry a high load. The problems are further exacerbated if the load is constituted by a high tank containing liquids that may splash to the effect that the risk of the trailer toppling on its side during the turning is further increased. This problem is of particular relevance when the trailer constitutes a field sprayer and a fold boom sprayer.

Since the distance between the wheels on the trailer is, as mentioned, determined by the corresponding distance between the wheels of the towing vehicle, the system chosen for influencing the turning of the trailer around the turning point may impose limitations to the options available to the constructer when the shape of the frame is to be determined. This will also be the case inasmuch as the load of the trailer is concerned, including eg the configuration of the liquid tank, where a field sprayer may be concerned that constitutes the load. The liquid tank and the frame must thus be shaped specifically for allowing space for the movement of the wheels during turning of the wheel frame. It follows from this that the tank of such trailers must be made even narrower at the bottom than is shown in FIG. 1 of EP 862 855, where the wheel axles of the trailer are fixedly mounted. In order to compensate for such reduction in dimensions at the bottom of the tank, the constructor will often strive to increase the height of the liquid tank, which may, however, lead to quite serious problems with stability, in particular during turning around a turning point.

It is an object of the invention to provide a trailer that can be steered though curves and that reduces the limitations that may be imposed on the shape of the load. This is accomplished as featured in claim 1 in that the connecting means mentioned above are configured such that they also allow a controlled, transversal movement of the frame in relation to the wheel frame in a direction towards or away from said turning point, ie transversally to the direction of driving, simultaneously with said relative turning of the wheel frame taking place; and that the trailer comprises actuator means for producing said transversal movement of the frame. It will be understood that the trailer may be provided with more than one wheel frame of the type described, albeit at present a configuration with one wheel frame is preferred.

Advantageous embodiments will appear from the dependent claims. The trailer can thus be an integral part of a tool, such as an agricultural implement, where the load is a receptacle for spraying liquid that extends very closely to the rearmost end of the trailer, the wheels being arranged at the rear end of the trailer, opposite the coupling. The connecting means may in a simple manner be configured as at least two arms that are pivotally connected to the frame and the wheel frame, respectively, and that constitute a trapezoidal mechanism for controlling the movement of the wheel frame along a curve track.

The invention also relates to a system comprising a combination of the trailer and a towing vehicle and a method of steering a trailer through curves.

Figure 1B:
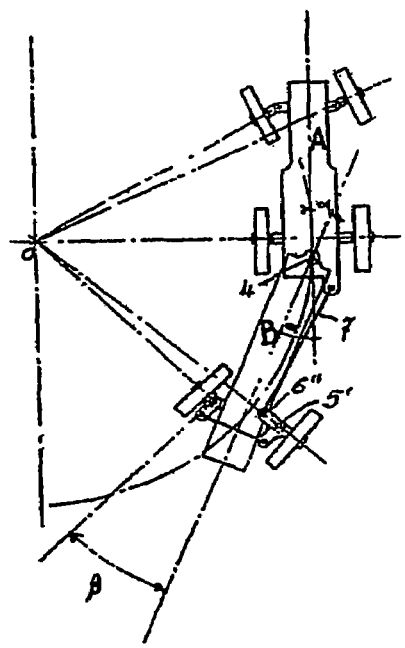
Figure 2C:
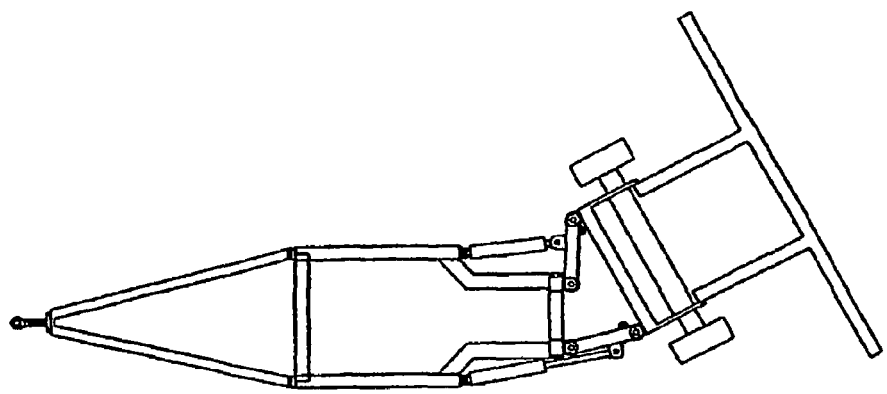
Figure 2B:
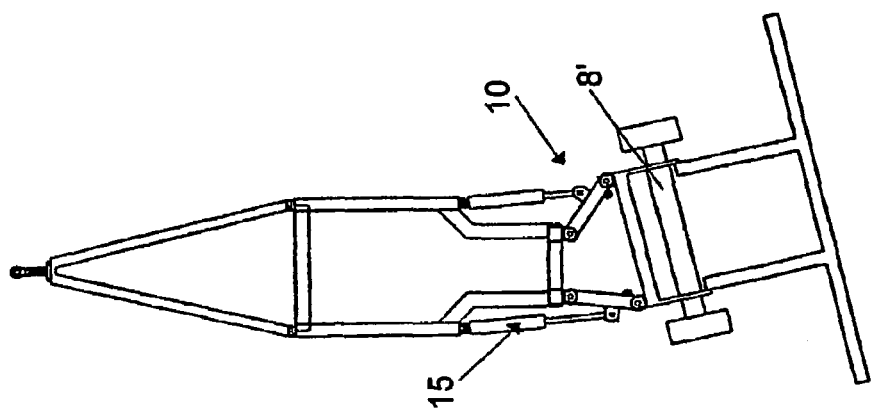
Figure 2A:
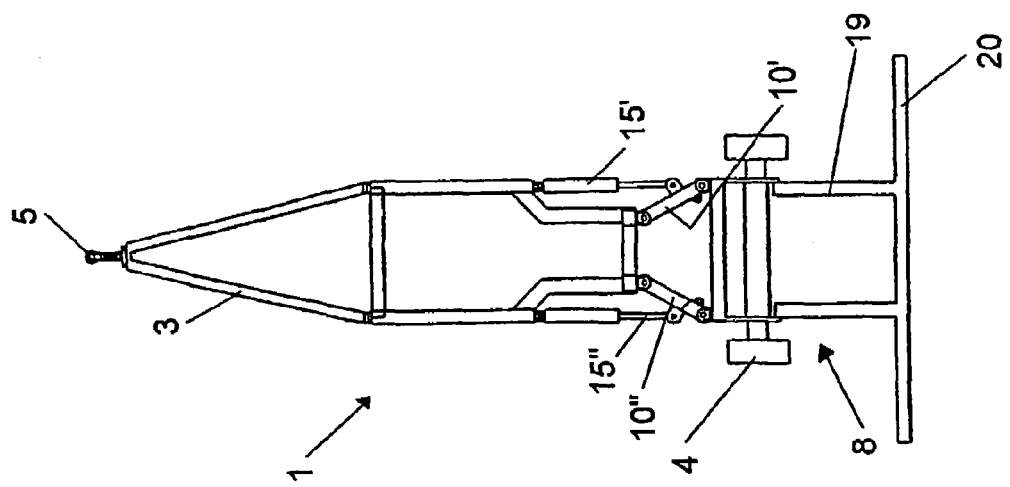
Figure 3:
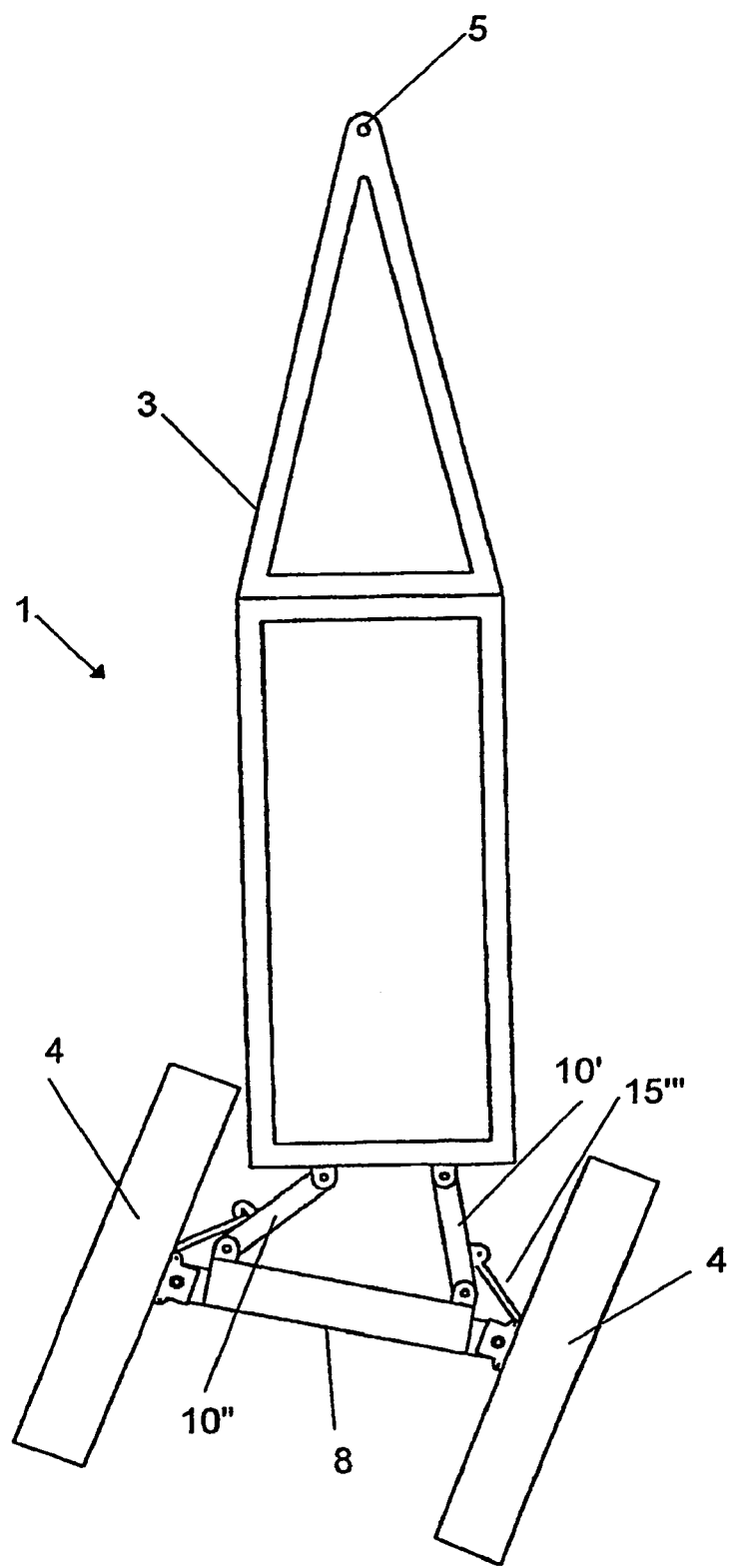

In the following, the invention will be explained in further detail with reference to the drawing, wherein FIGS. 1a and 1b show how the wheels on a trailer can be steered when the trailer is towed after a towing vehicle and when it is desired that the trailer should follow the track of the towing vehicle;

FIGS. 2a, 2b and 2c show respective positions for the trailer according to the invention during movements through curves having different radii; and FIG. 3 shows an alternative embodiment of the trailer, wherein the wheels have a further degree of freedom.

In FIGS. 1a and 1b, two solutions known from BE 473 218 are represented for controlling the wheels of a trailer and it will appear how, in order to ensure that the wheel tracks of the trailer follow the wheel tracks of the towing vehicle, it is necessary to see to it that the wheels on the wheel frame are at any time perpendicular to a straight line that extends to the turning point O.

By the present invention the latter condition must also be complied with in those cases where it is desired that the wheel tracks of the trailer are to follow the wheel tracks of the towing vehicle during turning around a turning point O, and it can be ensured by providing, either on the towing vehicle or on the trailer, a control unit with a memory that will, via actuator means, produce a predetermined setting of the frame in relation to the wheel frame, as will be explained below.

FIGS. 2a, 2b and 2c show a trailer 1 according to the invention. Preferably the trailer 1 is connected directly to the towing hook on the towing vehicle via a coupling in the form of a tow ring at the front end of the frame 3. The wheel frame 8 of the trailer 1 that carries the wheels that support the trailer is movably mounted on the frame 3 at the rear end thereof, in such a manner that the frame may—in relation to the wheel frame 8—be forced to turn and simultaneously forced to swing sideways and outwards transversally to the direction of driving towards or away from the turning point O in relation to the wheel frame 8. When the combined vehicle drives straight ahead, the wheels 4 are, of course, parallel with the wheels (not shown) of the towing vehicle, and the wheel frame 8 extends in extension of the frame 3 behind same. When the towing vehicle turns and it is thus time to swing around a turning point O, the frame 3 will be conveyed to the side, while simultaneously the frame turns in relation to the wheel frame 8.

In order to obtain this translatory and rotary movement of the frame 3, the frame 3 is preferably connected to the wheel frame 8 via connecting means 10 in the form of a trapezoidal connection comprising two arms of equal lengths 10', 10", each of which is pivotally connected to the frame 3 and the wheel frame 8, respectively. Hereby the frame 3 is controlled by the particular pattern of movement that follows from the freedom of movement of the trapezoidal connection. FIG. 2a shows that the arms 10', 10" converge in a direction towards the frame 3, but it may very well be an option to have an alternative configuration, wherein the arms 10', 10" converge in a direction towards the wheel frame 8. It may in some cases entail a favourable increase of the trailer stability during turning.

When the towing vehicle starts to move, actuator means 15 in the form of eg hydraulic cylinders 15", 15" control the movement of the frame 3, to the effect that the frame 3 adapts to the desired position. The control of the hydraulic cylinders 15', 15" may occur in correspondence with a detected angle between the towing vehicle and the wheel frame 8.

When, in particular in connection with field sprayers, where the frame 3 carries a large liquid tank, it is a point of interest to accomplish a swinging of the frame 3 and not merely a turning of the wheel frame 8 or of the axle 8' of the wheels 4, it is due to the fact that such turning on its own may limit the dimensions of the tank transversally to the frame 3 at the bottom at the wheels 8 and on the connecting rods (19) between the wheel frame 8 and the beam 20, as the wheels may bump against the tank and/or the connecting bars 19.

It is preferred that the axes of rotation of the wheels 4 in relation to the wheel frame 8 are fixed as shown in FIGS. 2a-2c, and that thus the freedom of movement resides primarily in the movability of the wheel frame 8 in relation to the frame 3.

In some situations, as shown specifically in FIG. 3 it may be expedient to build in a system for turning the wheels 4 in relation to the wheel frame 8, eg if the remaining constructive elements on the frame 3 prevent a sufficiently large slewing of the wheel frame 8. This turning movement may be generated eg by means of a system of actuator means as shown by the reference numeral 15''', in addition to the actuator means 15', 15" (not shown in FIG. 3).

In FIGS. 2a-c and FIG. 3, the wheel frame 8 is shown with an elongate beam 20 at the rear. This beam 20 may in a convenient manner support a boom sprayer optionally with an associated air blower device, as shown in WO 95/16347.

The invention claimed is:

1. A trailer for towing after a towing vehicle, said trailer comprising:
   a) a frame configured for carrying a load and having:
      i) a front end with a coupling configured for connecting said trailer to said towing vehicle and allowing that said frame and said towing vehicle are able to assume different angular positions in relation to each other during turning of said towing vehicle and said trailer along a curve track having a turning point; and
      ii) a rear end;
   b) a separate wheel frame that is connected to said rear end of said frame by at least one connecting link that allows a relative turning of said frame in relation to said wheel frame during said turning of said towing vehicle and said trailer along said curve track, said wheel frame comprising oppositely arranged wheels that support said trailer during said towing and that are arranged at a distance from each other close to a respective longitudinally extending side of said frame; and
   c) an actuator configured to produce said relative turning of said frame in relation to said wheel frame;
   wherein said connecting link also allows a controlled transverse movement of said frame in relation to said wheel frame in a direction towards or away from said turning point, that is in a direction transverse to the direction of driving, simultaneously with said relative turning of said frame in relation to said wheel frame; and
   said actuator also produces said transverse movement of said frame.

2. A trailer according to claim 1, wherein said wheel frame is arranged behind said rear end of said frame in order to thus constitute said rear end of said trailer.

3. A trailer according to claim 1, wherein said wheel frame carries an agricultural implement.

4. A trailer according to claim 1, wherein said load is a liquid container.

5. A trailer according to claim 4, wherein said container extends until or beyond said rear end of said frame; and that said wheels are arranged at said rear end of said trailer frame opposite said coupling.

6. A trailer according to claim 1, wherein said wheels are also arranged for turning about a vertical or essentially vertical axis in relation to said wheel frame; and an actuator is coupled to said wheel frame to produce said turning.

7. A trailer according to claim 1, wherein said connecting link constitutes at least two arms that are pivotally connected to said frame and said wheel frame respectively, and constitute a trapezoidal mechanism for controlling said movement of said frame along a curve track in relation to said wheel frame.

8. A trailer according to claim 1, wherein said trailer includes a control unit with a memory that produces, via said actuator, a predetermined fixed setting of said frame in relation to said wheel frame in correspondence with the angle between said towing vehicle and said wheel frame.

9. A trailer according to claim 1, said actuator being connected to said frame, to said wheel frame and/or to said connecting link.

10. A system comprising a towing vehicle and a trailer according to claim 1, wherein said system includes a control unit with a memory that produces, via the actuator, a predetermined fixed setting of said frame in relation to said wheel frame in correspondence with the angle between said towing vehicle and said wheel frame.

11. A system according to claim 10, wherein the mutual distances transverse to the direction of driving between said wheels of said towing vehicle and between said wheels of said trailer are essentially identical.

12. A system according to claim 10, wherein said control unit is configured for ensuring that at least one set of wheels on said towing vehicle and said wheels of said trailer move along the same curved line during turning about said turning point.

13. A method of steering a trailer around a turning point, comprising the steps of:
  towing a trailer by a towing vehicle, wherein the trailer comprises:
    a frame configured for carrying a load, the frame having a front end with a coupling configured for connecting the trailer to the towing vehicle, and a rear end;
    a separate wheel frame connected to the rear end of the frame by connecting links, said wheel frame comprising oppositely arranged wheels that support the trailer during the towing and that are arranged at a distance from each other close to a respective longitudinally extending side of the frame; and
    an actuator configured to produce said relative turning of the frame in relation to the wheel frame;
  establishing a relative turning of the frame in relation to the wheel frame; and
  controlling the connecting links with said actuator, to provide a controlled transversal movement of said frame, in relation to said wheel frame, in a direction towards or away from said turning point simultaneously with said relative turning of said frame in relation to said wheel frame.

14. A method of steering a trailer around a turning point according to claim 13, wherein said method further comprises the steps of:
  determining the setting of said frame in relation to said wheel frame;
  supplying said setting to a control unit; and
  controlling said actuator from an output from said controller.

15. A trailer for towing after a towing vehicle, said trailer comprising:
  a) a frame configured for carrying a load having:
    i) a front end with a coupling configured for connecting said trailer to said towing vehicle and allowing that said frame and said towing vehicle are able to assume different angular positions in relation to each other during turning of said towing vehicle and said trailer along a curve track having a turning point; and
    ii) a rear end;
  b) a separate wheel frame that is connected to said rear end of said frame with connecting links constituting at least two arms that are pivotally connected to said frame and said wheel frame respectively, and constitute a trapezoidal mechanism for controlling said movement of said frame along a curve track in relation to said wheel frame, said wheel frame comprising oppositely arranged wheels that support said trailer during said towing and that are arranged at a distance from each other close to a respective longitudinally extending side of said frame; and
  c) an actuator configured to produce said relative turning of said frame in relation to said wheel frame,
  said connecting links also configured to allow a controlled transverse movement of said frame in relation to said wheel frame in a direction towards or away from said turning point, that is in a direction transverse to the direction of driving,
  simultaneously with said relative turning of said frame in relation to said wheel frame; and
  said actuator also configured to produce said transverse movement of said frame.

16. A trailer according to claim 15, wherein said wheel frame is arranged behind said rear end of said frame in order to thus constitute said rear end of said trailer.

17. A trailer according to claim 15, wherein said wheel frame carries a folding boom sprayer.

18. A trailer according to claim 15, wherein the load is a liquid container.

19. A trailer according to claim 18, wherein said container extends until or beyond said rear end of said frame; and that said wheels are arranged at said rear end of said trailer opposite said coupling.

20. A trailer according to claim 15, wherein said wheels are also arranged for turning about a vertical or essentially vertical axis in relation to said wheel frame; and the trailer further includes a second actuator coupled to said wheel frame to produce said turning of said wheels in relation to said wheel frame.

21. A trailer according to claim 15, wherein in a control unit with a memory that produces, via said actuator, a predetermined fixed setting of said frame in relation to said wheel frame in correspondence with the angle position between said towing vehicle and said wheel frame.

22. A trailer according to claim 15, wherein said actuator is connected to said frame, to said wheel frame and/or to said connecting link.

* * * * *